United States Patent [19]
Yahata

[11] Patent Number: 5,882,088
[45] Date of Patent: Mar. 16, 1999

[54] BICYCLE HUB

[75] Inventor: Yasuhiro Yahata, Sakai, Japan

[73] Assignee: Shimano, Inc., Osaka, Japan

[21] Appl. No.: 784,460

[22] Filed: Jan. 16, 1997

[30] Foreign Application Priority Data

Jan. 26, 1996 [JP] Japan .................................. 8-011679

[51] Int. Cl.⁶ .............................................. B60B 21/06
[52] U.S. Cl. ........................................ 301/110.5; 301/59
[58] Field of Search ................................ 301/55, 56, 59, 301/61, 105.1, 110.5

[56] References Cited

U.S. PATENT DOCUMENTS

| D. 364,842 | 12/1995 | Hoeppner et al. | D12/207 |
|---|---|---|---|
| 478,394 | 7/1892 | Bretz | 301/56 |
| 607,175 | 7/1898 | Keating | 301/56 |
| 5,494,337 | 2/1996 | Behnke | 301/59 |

FOREIGN PATENT DOCUMENTS

| 125801 | 7/1931 | Austria | 301/56 |
|---|---|---|---|
| 391497 | 8/1908 | France | 301/59 |
| 2324471 | 4/1977 | France . | |
| 76301 | 5/1983 | Japan | 301/56 |
| 263802 | 11/1986 | Japan | 301/56 |
| 2-22321 | 6/1990 | Japan . | |
| 8108701 | 4/1996 | Japan . | |

*Primary Examiner*—Russell D. Stormer
*Attorney, Agent, or Firm*—James A. Deland

[57] ABSTRACT

A bicycle hub apparatus is constructed of a hub shell and a plurality of spoke attachment parts disposed circumferentially about the hub shell at opposite end portions of the hub shell, wherein each spoke attachment part includes a first through hole and a second through hole. In each spoke attachment part, the first through hole is located at a different radial position relative to a central hub axis of the hub shell when compared to the second through hole.

8 Claims, 8 Drawing Sheets

BICYCLE HUB

BACKGROUND OF THE INVENTION

The present invention is directed to bicycle hubs used to support wheel rims via spokes.

The wheel on a bicycle usually has a hub shell rotatably supported on an axle, spokes that are engaged in the hub, a rim that is linked to the hub by nipples that thread onto the radially outward ends of the spokes, and a tire that is mounted on the rim. The two ends of the hub shell are each provided with a flange part that is used to engage the spokes. Through holes that are used to engage the spokes are made in these flange parts in the hub axle direction at distance from each other in the circumferential direction. The spoke is usually bent on its distal side, and a distal flange that is formed in the shape of a nail head is disposed at this bent distal end. The distal end is supported in one of the through holes in the hub flange. Male threads are formed on the base side of the spoke for engaging the nipple, and the nipple has a flange that engages with the rim.

With a spoke structured in this manner, the nipple is installed in a nipple hole formed in the rim, the spoke is inserted from its base side into the through hole of the hub, the distal flange is engaged in the through hole, and the male threads on the base side of the spoke are threaded into the female threads of the nipple installed in the rim, thereby linking the hub and the rim.

With this type of wheel, tension is always acting on the spoke shafts intermittently, so fatigue can cause the spoke shafts to break at the bent portion on the base side of the distal flange. In order to prevent this, Japanese Utility Model Publication H2-22321 discloses a wheel hub that allows the mounting of straight spokes in which the base side of the distal flange of the spoke is roughly linear. This hub has a plurality of spoke attachment parts at a distance from each other in the circumferential direction on both ends of the hub shell. In the spoke attachment parts are made a pair of spoke holes that go through in the circumferential direction (the tangential direction) at the same radial twisting position and that are aligned in the axial direction. These spoke holes are made at a slight angle with respect to the circumferential direction, and are formed such that the spoke shafts face slightly inward. With a wheel in which this hub is used, the spokes are connected to the rim by being bent slightly outward at the place where they come out of the spoke holes.

Since this type of hub allows straight spokes to be mounted, there is less spoke breakage than with a wheel in which spokes having bent distal portions are mounted. However, since the spoke holes are arranged so that they are aligned in the axial direction, the spacing in the hub axial direction of the left and right spokes that are engaged in the spoke holes on the inside in the axial direction is narrower than that on a wheel in which spokes having bent distal portions are mounted, which is a problem in that the horizontal rigidity of the wheel (the rigidity in the hub axial direction) is lower.

SUMMARY OF THE INVENTION

The present invention is directed to a bicycle wheel hub which reduces spoke breakage while minimizing any decrease in horizontal rigidity. In one embodiment of the present invention, a bicycle hub apparatus is constructed of a hub shell and a plurality of spoke attachment parts disposed circumferentially about the hub shell at opposite end portions of the hub shell, wherein each spoke attachment part includes a first through hole and a second through hole. In each spoke attachment part, the first through hole is located at a different radial position relative to a central hub axis of the hub shell when compared to the second through hole. With this type of structure, straight spokes can be used to mount the rim to the hub (thus resulting in less spoke breakage), and the spacing of the left and right spokes in the axial direction of the hub can be made wider than if the through holes were aligned in the axial direction (thus minimizing decrease in horizontal rigidity of the wheel).

In a more specific embodiment, each spoke attachment part includes a protruding portion that extends radially outwardly from the hub shell, wherein the first through hole and the second through hole in each spoke attachment part are located within the protruding portion. Alternatively, the plurality of spoke attachment parts may be formed in flange-shaped members disposed at the opposite end portions of the hub shell.

If desired, the first through hole and the second through hole in each spoke attachment part may be located in different positions in the direction of the hub axis, or else the first through hole and the second through hole may be located in same positions in the direction of the hub axis. Furthermore, the first through hole may be oriented generally parallel to the second through hole, or the first through hole may be inclined relative to the second through hole.

DETAILED DESCRIPTION OF THE EMBODIMENTS

Figure 1:
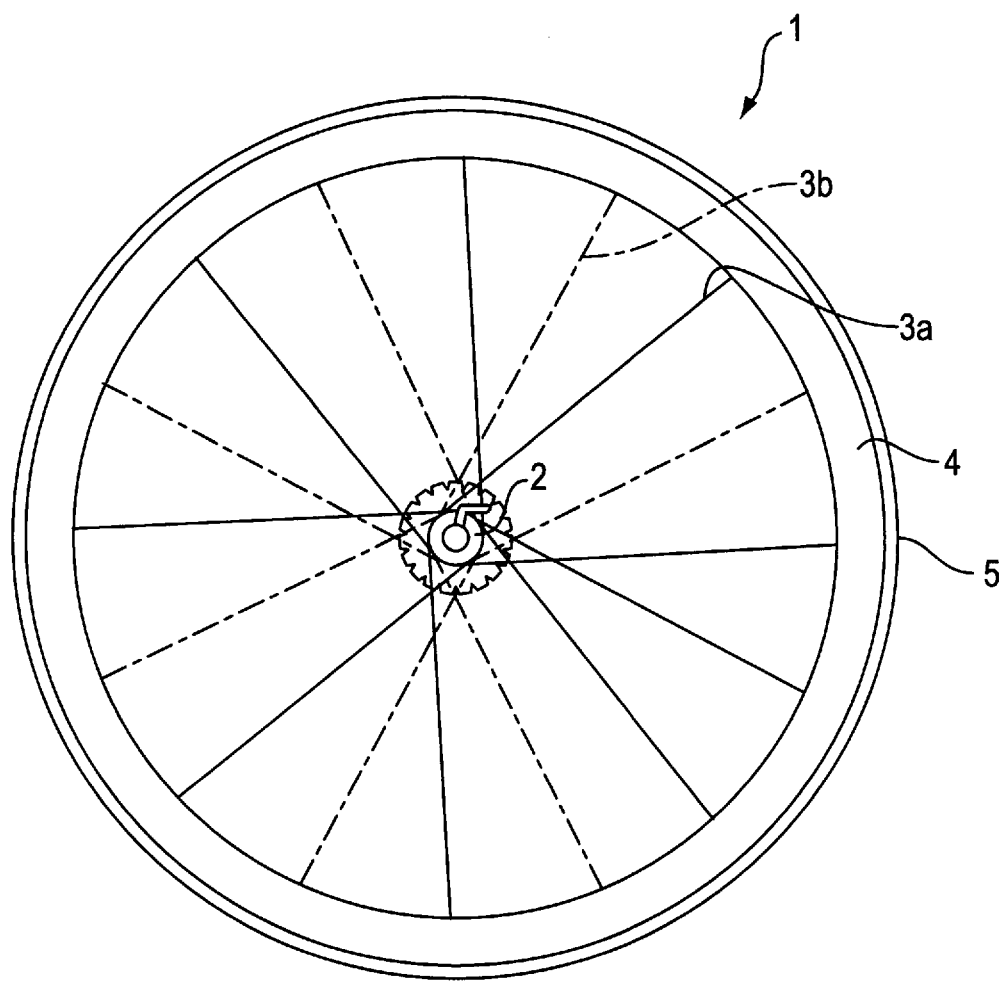
FIG. 1 is a side view of a rear wheel which includes a particular embodiment of a bicycle hub according to the present invention.
Figure 2:
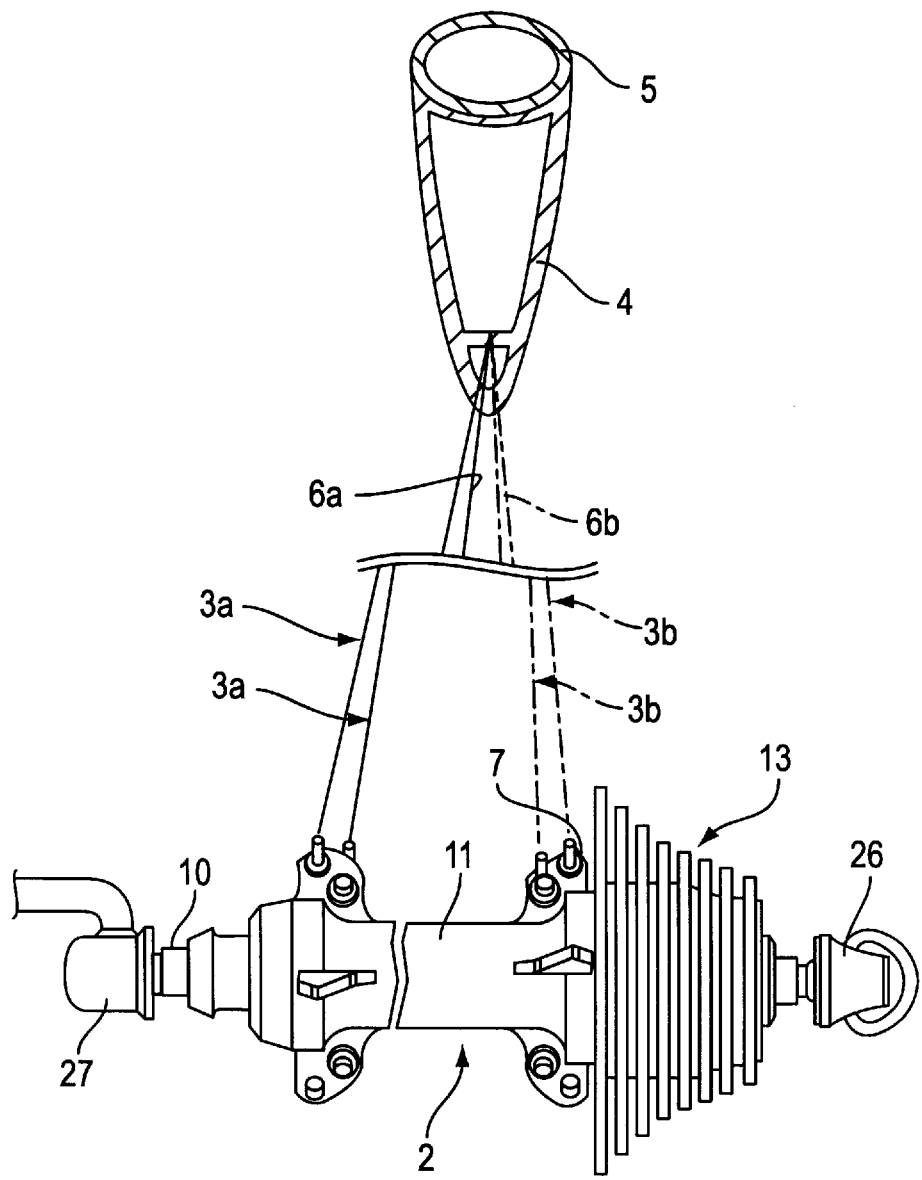
FIG. 2 is a partial cross-sectional view of the wheel shown in FIG. 1.

FIG. 1 is a side view of a rear wheel which includes a particular embodiment of a bicycle hub according to the present invention, and FIG. 2 is a partial cross-sectional view of the wheel shown in FIG. 1. In these figures, the rear wheel 1 has a hub 2, straight spokes 3a and 3b that are inclined slightly outward and extend from the left and right ends of the hub 2 in roughly the tangential direction, a rim 4 that is engaged with the distal ends of the spokes 3a and 3b, and a tire 5 that is mounted on the rim 4.

The spokes 3a and 3b have straight spoke portions 6a and 6b having male threads on their base side and having distal flanges in the shape of a nail head on their distal ends. Nipples 7a and 7b (FIGS. 4 and 5) thread onto the base side of the spoke portions 6a and 6b. The spokes 3a and 3b (8 each, for a total of 16, for example) extend from the left and right ends of the hub 2 toward the rim 4. In FIGS. 1 and 2, the spokes 3a on the left side are indicated by solid lines, and the spokes 3b on the right side are indicated by broken lines.

Since the rim 4 is a so-called deep rim, in which the rim height is greater than the rim width, the distal flanges of the spoke portions 6a and 6b are engaged with the rim 4. The hub 2 and the rim 4 are linked by screwing in the nipples 7a and 7b that engage the bases of the spoke portions 6a and 6b with the rim 4. The tire 5 is a tubular tire, and it is mounted to the rim 4 by means of rim cement.

Figure 3:
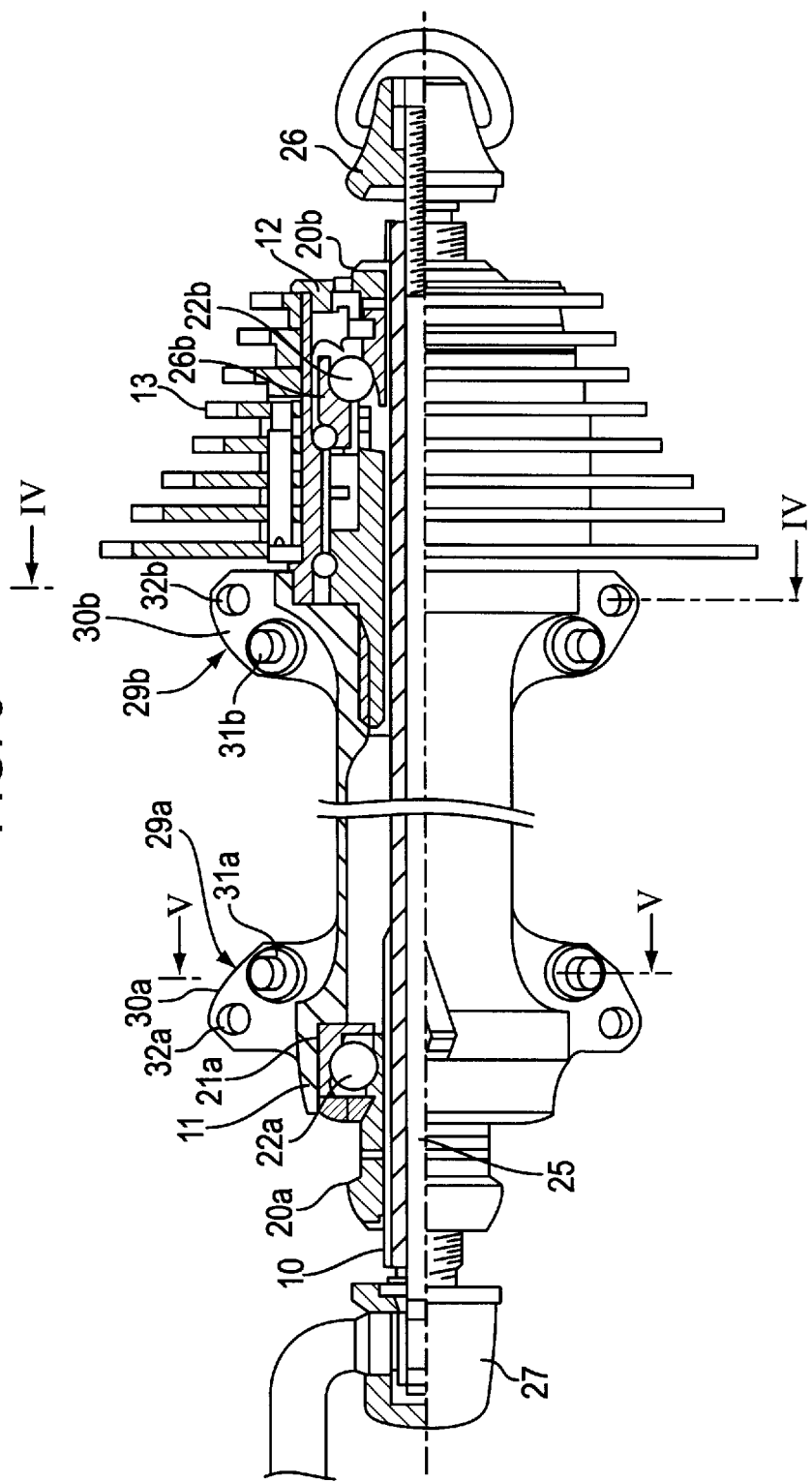
FIG. 3 is a partial cross-sectional view of the hub shown in FIG. 2.

As shown in detail in FIG. 3, the hub 2 is a freehub type in which the freewheel is integrated. Hub 2 has a hollow hub axle 10 on which male threads are formed on both ends, a cylindrical hub shell 11 that is rotatably supported on the hub axle 10, and a freewheel 12 that is mounted on the right end of the hub shell 11. A multiple sprocket assembly 13 composed of 8 gears is non-rotatably mounted to the freewheel 12 on the outer body side. The drive power transmitted to the multiple sprocket assembly 13 is transmitted by the freewheel 12 via a chain to the hub shell 11 in only one direction.

A pair of left and right cones 20a and 20b that make up bearings are screwed into both ends of the hub axle 10. Hub cups 21a and 21b are mounted around the inner periphery of the left end of the hub shell 11 and around the inner periphery of the right end of the freewheel 12, and steel balls 22a and 22b are arranged between the cones 20a and 20b and the hub cups 21a and 21b, respectively. A quick-release hub rod 25 is inserted into the axial center of the hub axle 10, and an adjusting nut 26 and a quick-release lever 27 are attached to both ends of the quick-release hub rod 25.

The center portion of the hub shell 11 is a constricted small diameter portion, with the diameter gradually increasing toward the ends. Four sets of left and right pairs of spoke attachment parts 29a and 29b are formed around the outer periphery of both ends of the hub shell 11. The spoke attachment parts 29a and 29b have flat protrusions 30a and 30b, and inner and outer pairs of through holes 31a, 32a, 31b, and 32b that go through the protrusions 30a and 30b in the circumferential direction. The protrusions 30a and 30b protrude in the diametric direction and are provided at four places each on the left and right ends at a distance from each other in the circumferential direction. The inner through holes 31a and 31b and the outer through holes 32a and 32b go through the front and rear walls of the left and right protrusions 30a and 30b in the circumferential direction of the hub shell 11 at different positions in the radial direction from the center of the hub axle 10, that is, at different positions in the radial direction in the plane that includes the hub axle 10. The through holes 31a, 32a, 31b, and 32b are holes that serve to engage the nipples 7a and 7b of the spokes 3a and 3b.

Figure 4:
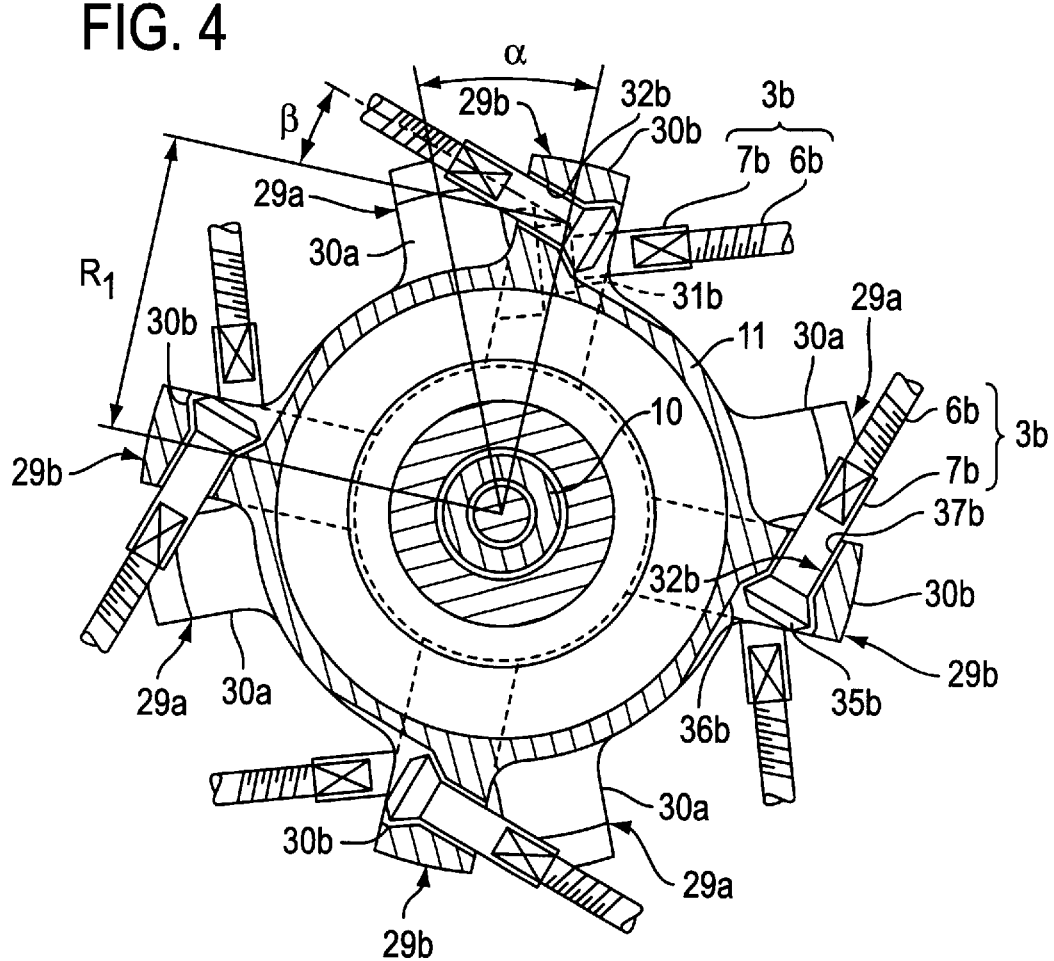
FIG. 4 is a cross-sectional view taken along line IV—IV in FIG. 3.
Figure 5:
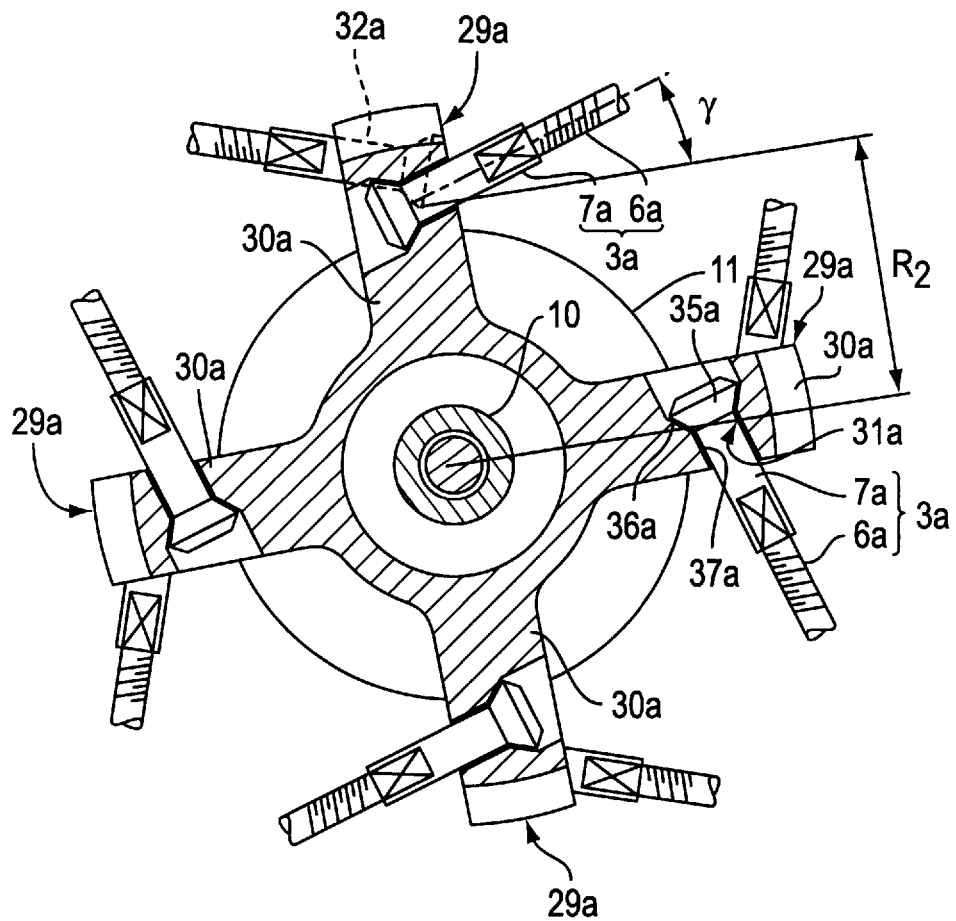
FIG. 5 is a cross-sectional view taken along line V—V in FIG. 3.

As shown in FIGS. 4 and 5, the protrusions 30a and 30b are provided at regular intervals in the circumferential direction, 90 degrees apart from each other. The protrusions 30a on the left side and the protrusions 30b on the right side are shifted by an angle of α (such as 22.5 degrees). The outer through holes 32a and 32b are inclined outward by an angle of β (such as 18 degrees) at a position of radius $R_1$ from the center of the hub axle 10. The inner through holes 31a and 31b are inclined outward by an angle of γ (such as 18.5 degrees) at a position of radius $R_2$ (smaller than the radius $R_1$) from the center of the hub axle 10. In other words, the inner and outer through holes 31a, 32a, 31b, and 32b are made such that they are inclined relative to each other, rather than parallel, at different radial positions. The respective through holes 31a, 32a, 31b, and 32b have large diameter portions 36a and 36b, into which the flanges 35a and 35b of the nipples 7a and 7b are inserted, and small diameter portions 37a and 37b. The flanges 35a and 35b are engaged at the step created between the large diameter portions 36a and 36b and the small diameter portions 37a and 37b.

When the rear wheel 1 structured as above is assembled, the spoke portions 6a and 6b are passed through the rim 4, and the nipples 7a and 7b are mounted in the through holes 31a, 32a, 31b, and 32b of the hub 2. The spoke portions 6a and 6b that have been passed through the rim 4 roughly opposite the nipples 7a and 7b mounted in the outer through holes 32a and 32b are tightened loosely and roughly equally using a nipple wrench or other such tool. Here, the respective spoke portions 6a and 6b are arranged across from each other. As a result, the four left and four right spoke portions 6a and 6b are loosely tightened. Next, the spoke portions 6a and 6b that have been passed through the rim 4 roughly opposite the nipples 7a and 7b mounted in the inner through holes 31a and 31b are tightened loosely and roughly equally. The rear wheel 1 is then mounted in a run-out adjustment stand or other such jig and the horizontal run out is adjusted with a nipple wrench, after which the wheel is removed from the run-out adjustment stand and the offset of the rim is inspected using a rim center gauge. Finally, the rear wheel 1 is remounted in the run-out adjustment stand and the horizontal run out is adjusted, thus completing the rear wheel 1.

With the rear wheel 1 that makes use of the hub 2 structured as above, there is less spoke breakage since straight spokes are used. Also, since the inner and outer pairs of through holes 31a, 32a, 31b, and 32b that engage the spokes 3a and 3b are formed at different radial positions $R_1$ and $R_2$ from the center of the hub axle 10, the spacing in the hub axle direction of the left and right spokes 3a and 3b can be wider than when the through holes 31a, 32a, 31b, and 32b are aligned in the hub axle direction. Accordingly, the rigidity of wheel in its rotational direction remains high, while the decrease in horizontal rigidity can be minimized. Also, since the nipples 7a and 7b side of the spokes 3a and 3b is engaged with the hub 2, adjustment work can be performed without the tire being removed even in cases when run-out adjustment and other such adjustment cannot be performed unless the tire is removed when the nipples are arranged on the rim side, as with a deep rim. Since the through holes 31a, 32a, 31b, and 32b are made in the twisting direction, there is less tool interference in the machining of the through holes.

Figure 6:
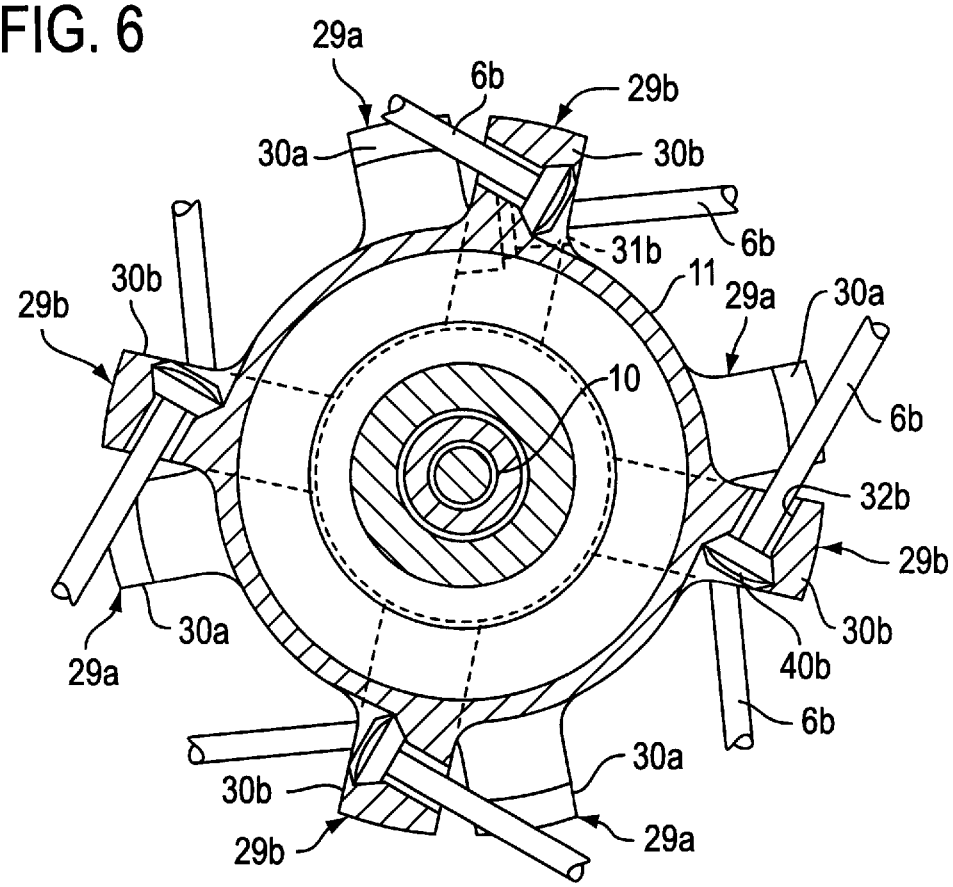
FIG. 6 is a cross-sectional view of an alternative embodiment of a bicycle hub according to the present invention.

FIG. 6 is a cross-sectional view of an alternative embodiment of a bicycle hub according to the present invention. As shown in FIG. 6, distal flanges 40a and 40b (only 40b is shown) of the spoke portions 6a and 6b may be engaged in the through holes 31a, 32a, 31b, and 32b (only 31b and 32b are shown). In this case, the tire must be removed when a deep rim is used, but when an ordinary rim is used, run-out adjustment work will be easier because the spacing between the nipples will be wider than on the hub side.

Figure 7:
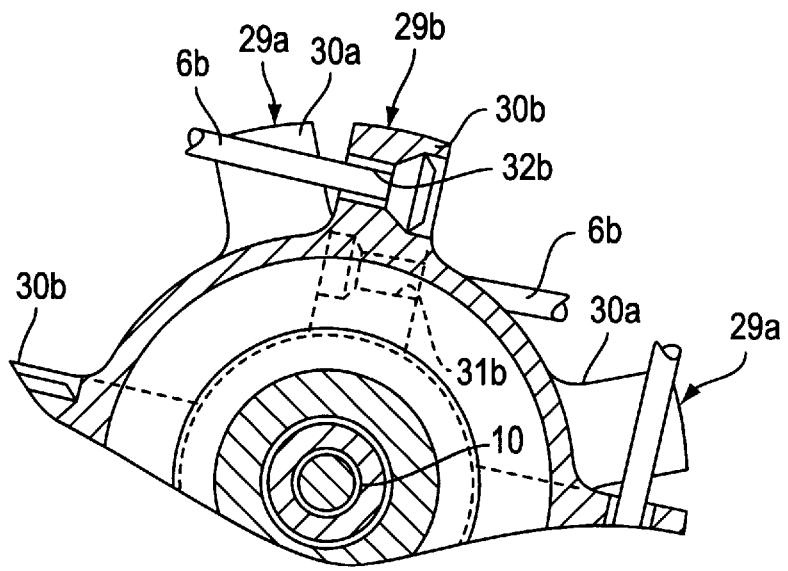
FIG. 7 is a cross-sectional view of another alternative embodiment of a bicycle hub according to the present invention.

FIG. 7 is a cross-sectional view of another alternative embodiment of a bicycle hub according to the present invention. As shown in FIG. 7, the inner and outer through holes 31a, 32a, 31b, and 32b (only 31b and 32b are shown) may be made parallel, rather than in the twisting direction.

Figure 8:
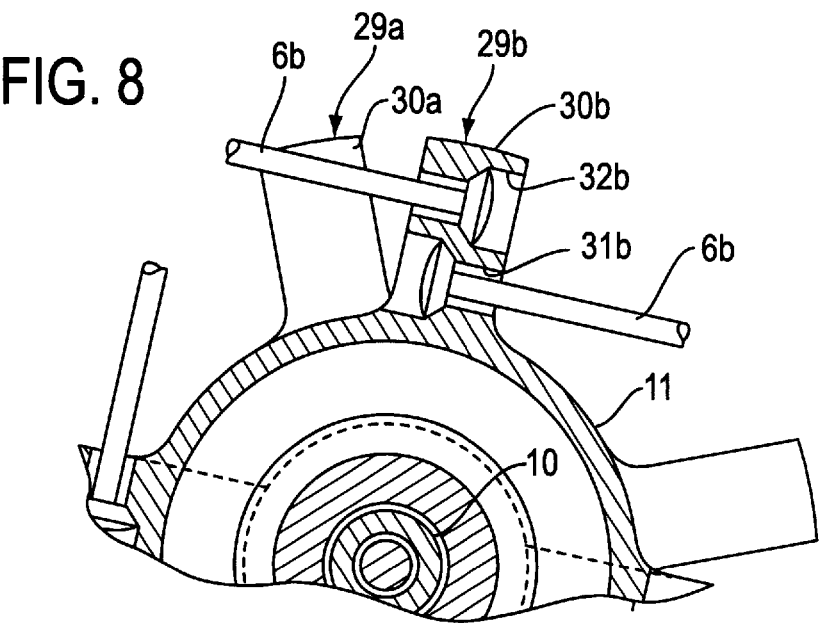
FIG. 8 is a cross-sectional view of another alternative embodiment of a bicycle hub according to the present invention.
Figure 9:
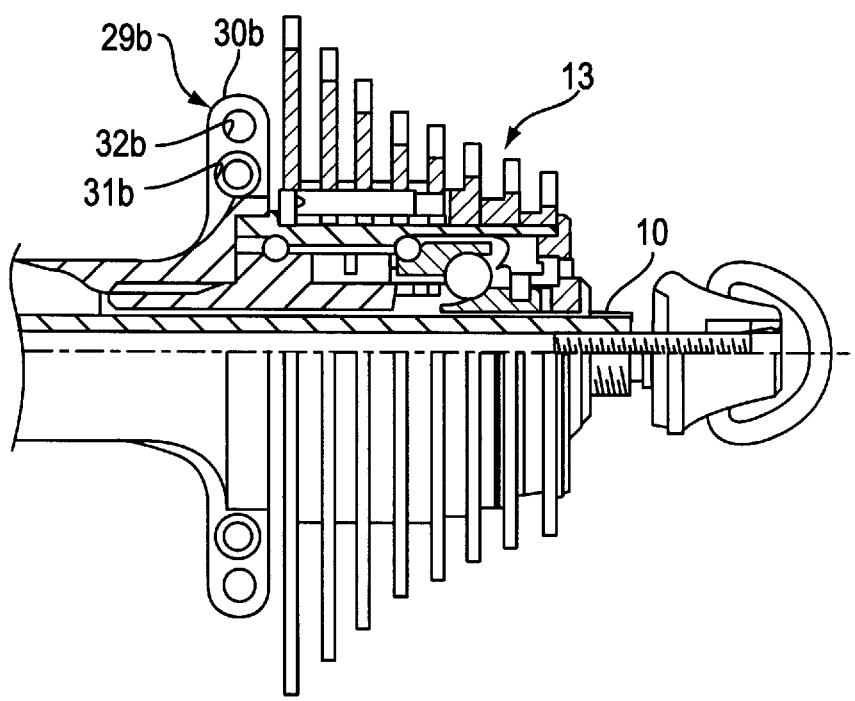
FIG. 9 is a partial cross-sectional view of another alternative embodiment of a bicycle hub according to the present invention.

FIGS. 8 and 9 are a cross-sectional views of further alternative embodiments of a bicycle hub according to the present invention. As shown in FIGS. 8 and 9, the through holes 31a, 32a, 31b, and 32b (only 31b and 32b are shown) may be made such that they line up in different radial positions in the same plane that is perpendicular to the hub axle 10. In this case, the spacing of the left and right spokes in the hub axle direction can be made even wider and the horizontal rigidity even higher than when the holes are not in the same plane.

Figure 10:
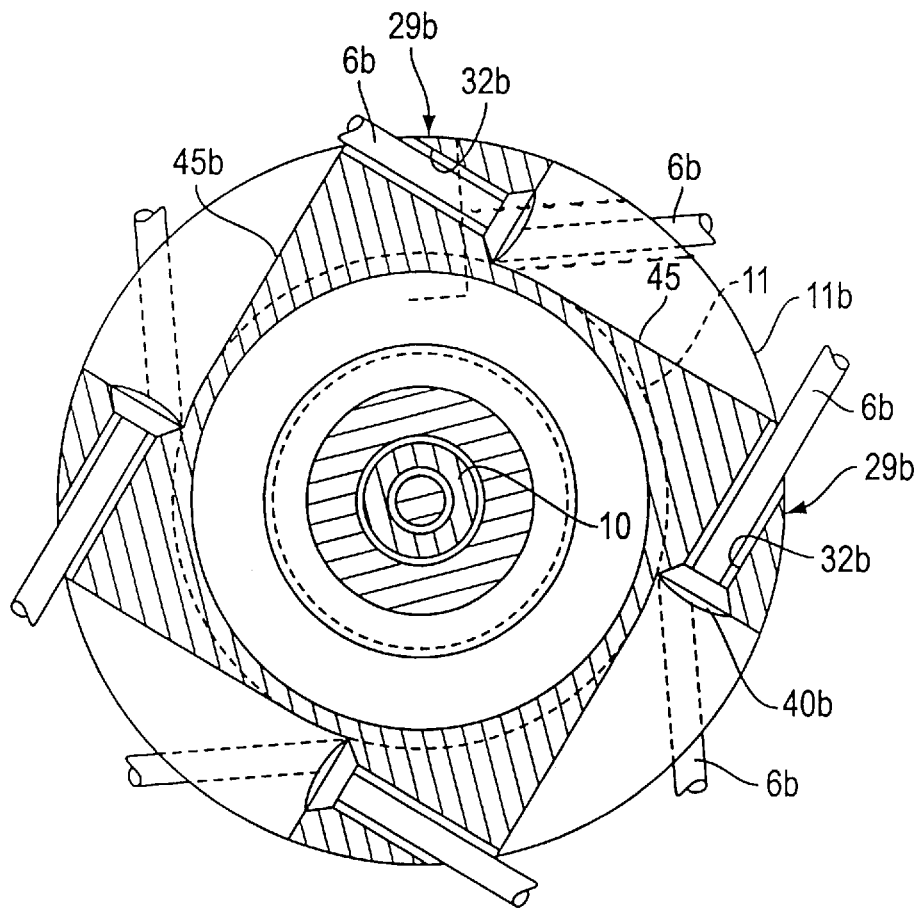
FIG. 10 is a cross-sectional view of another alternative embodiment of a bicycle hub according to the present invention.

FIG. 10 is a cross-sectional view of another alternative embodiment of a bicycle hub according to the present invention. As shown in FIG. 10, the spoke attachment parts 29a and 29b (only 29b is shown) may be formed at four places at a distance from each other in the circumferential direction in flanges 11a and 11b (only 11b is shown) formed on both ends of the hub shell 11. In this case, the through holes 31a, 32a, 31b, and 32b (only 32b is shown) are formed up to the peripheral ends of the flanges 11a and 11b, and counterbore parts 45a and 45b (only 45b is shown) that are long in the spoke direction may be provided continuously with the through holes 31a, 32a, 31b, and 32b on the side where the distal flanges 40a and 40b (only 40b is shown) of the spoke portions 6a and 6b are positioned.

While the above is a description of various embodiments of the present invention, further modifications may be employed without departing from the spirit and scope of the present invention. For example, the present invention can also be applied to the front hub of a front wheel instead of to a rear wheel hub. The number of spoke attachment parts is not limited to four on the left and four on the right. Fewer spoke attachment parts result in a more lightweight assembly. Thus, the scope of the invention should not be limited by the specific structures disclosed. Instead, the true scope of the invention should be determined by the following claims.

What is claimed is:

1. A bicycle hub apparatus comprising:

a hub shell;

radially outwardly extending members disposed at opposite end portions of the hub shell, wherein each radially outwardly extending member has an outer peripheral surface;

a plurality of circumferentially disposed spoke attachment parts formed in each radially outwardly extending member, wherein each spoke attachment part includes a first through hole and a second through hole, wherein, in each spoke attachment part, the first through hole is located at a different radial position relative to a central hub axis of the hub shell when compared to the second through hole;

wherein each first through hole and each second through hole includes a larger diameter portion and a smaller diameter portion;

wherein the larger diameter portion of each first through hole and each second through hole extends through the outer peripheral surface of its associated radially outwardly extending member; and wherein each first through hole and each second through hole has parallel side walls.

2. The apparatus according to claim 1 wherein the first through hole and the second through hole lie in a common plane that intersects the hub axis.

3. The apparatus according to claim 1 wherein, in each spoke attachment part, the first through hole is inclined relative to the second through hole.

4. The apparatus according to claim 1 fuirther comprising, in each spoke attachment part,:

a first spoke having an end extending through the first through hole; and a second spoke having an end extending through the second through hole.

5. The apparatus according to claim 4 further comprising, in each spoke attachment part:

a first nipple threaded onto the end of the first spoke and engaged in the first through hole; and a second nipple threaded onto the end of the second spoke and engaged in the second through hole.

6. The apparatus according to claim 1 further comprising a hub axle, wherein the hub shell is rotatably supported on the hub axle.

7. The apparatus according to claim 1 wherein, in each spoke attachment part, the first through hole and the second through hole are radially aligned.

8. The apparatus according to claim 1 wherein the outer peripheral surface of each radially extending member has a circular shape viewed along the hub axis.

* * * * *